United States Patent
Liang et al.

(10) Patent No.: US 12,298,610 B2
(45) Date of Patent: May 13, 2025

(54) COPLANAR WAVEGUIDE WIRE ELECTRODE STRUCTURE AND MODULATOR

(71) Applicant: SUZHOU LYCORE TECHNOLOGIES Co., Ltd., Jiangsu (CN)

(72) Inventors: Hanxiao Liang, Jiangsu (CN); Yipin Song, Jiangsu (CN); Yincong Zhou, Jiangsu (CN); Haicang Wu, Jiangsu (CN); Wenhao Mao, Jiangsu (CN); Shiwei Song, Jiangsu (CN)

(73) Assignee: NANJING LYCORE TECHNOLOGIES CO., LTD., Jiangsu (CN)

( * ) Notice: Subject to any disclaimer, the term of this patent is extended or adjusted under 35 U.S.C. 154(b) by 254 days.

(21) Appl. No.: 17/638,818

(22) PCT Filed: Jan. 26, 2021

(86) PCT No.: PCT/CN2021/073696
§ 371 (c)(1),
(2) Date: Feb. 26, 2022

(87) PCT Pub. No.: WO2021/227560
PCT Pub. Date: Nov. 18, 2021

(65) Prior Publication Data
US 2022/0334419 A1    Oct. 20, 2022

(30) Foreign Application Priority Data
May 14, 2020    (CN) .......................... 202010409764.1

(51) Int. Cl.
*G02F 1/03*    (2006.01)
*G02F 1/035*    (2006.01)

(52) U.S. Cl.
CPC ........ *G02F 1/0356* (2013.01); *G02F 2202/20* (2013.01)

(58) Field of Classification Search
CPC .......................... G02F 1/0356; G02F 2202/20
See application file for complete search history.

(56) References Cited

U.S. PATENT DOCUMENTS

| | | | |
|---|---|---|---|
| 5,566,257 A | 10/1996 | Jaeger et al. | |
| 5,619,607 A * | 4/1997 | Djupsjobacka | G02F 1/2255 385/129 |

(Continued)

FOREIGN PATENT DOCUMENTS

| | | |
|---|---|---|
| CN | 105122124 A | 12/2015 |
| CN | 111061071 A | 4/2020 |
| CN | 111505845 A | 8/2020 |

OTHER PUBLICATIONS

Wang et al., Ultrahigh-efficiency wavelength conversion in nanophotonic periodically poled lithium niobate waveguides, Optica 5, 1438-1441 (2018) (Year: 2018).*

(Continued)

*Primary Examiner* — Peter Radkowski

(57) ABSTRACT

A coplanar waveguide wire electrode structure and a modulator includes a metal electrode and an optical waveguide. The metal electrode includes ground electrodes and a signal electrode. Connecting arms are arranged on both sides of the signal electrode. The inner sides of the ground electrodes are provided with other connecting arms. The tail ends of the connecting arms of the signal electrode are provided with signal wire extension electrodes, and the tail ends of the connecting arms of the ground electrodes are provided with ground wire extension electrodes. A distance is provided between the signal wire extension electrodes and the ground wire extension electrodes. The optical waveguide passes through the spaces between the signal wire extension elec- (Continued)

trodes and the ground wire extension electrodes. By extending the metal electrode, the distance between the electrodes is actually shortened.

9 Claims, 2 Drawing Sheets

(56) References Cited

U.S. PATENT DOCUMENTS

| | | | | |
|---|---|---|---|---|
| 6,310,700 B1* | 10/2001 | Betts | G02F 1/2255 | 359/2 |
| 6,377,717 B1* | 4/2002 | Kimber | G02F 1/225 | 385/2 |
| 6,647,158 B2* | 11/2003 | Betts | G02F 1/2257 | 385/2 |
| 7,426,321 B2* | 9/2008 | Eriksson | G02F 1/035 | 385/2 |
| 8,530,821 B2* | 9/2013 | Green | G02F 1/025 | 250/227.12 |
| 8,737,773 B2* | 5/2014 | Motoya | G02F 1/2255 | 385/2 |
| 8,849,071 B2* | 9/2014 | Kissa | G02F 1/225 | 385/50 |
| 9,470,952 B2* | 10/2016 | Dagli | G02B 6/125 | |
| 9,671,670 B2* | 6/2017 | Hollis | G02B 6/14 | |
| 9,733,543 B2* | 8/2017 | Dagli | G02F 1/0121 | |
| 9,746,743 B1* | 8/2017 | Rabiei | G02B 6/12009 | |
| 9,817,249 B2* | 11/2017 | Doerr | G02F 1/011 | |
| 9,835,927 B2* | 12/2017 | Velthaus | G02F 1/2255 | |
| 9,891,450 B2* | 2/2018 | Baudot | G02F 1/025 | |
| 9,939,708 B2* | 4/2018 | Aimone | G02F 1/2257 | |
| 9,964,784 B2* | 5/2018 | McBrien | G02F 1/0356 | |
| 10,088,734 B2* | 10/2018 | Kondou | G02F 1/2255 | |
| 10,168,596 B2* | 1/2019 | Williams | G02F 1/2257 | |
| 10,197,884 B2* | 2/2019 | Dagli | G02F 1/2255 | |
| 10,295,844 B2* | 5/2019 | Kissa | G02F 1/0316 | |
| 10,371,968 B2* | 8/2019 | McBrien | G02F 1/0102 | |
| 10,416,525 B2* | 9/2019 | Zhou | G02F 1/0121 | |
| 10,466,567 B1* | 11/2019 | Vera Villarroel | G02F 1/2255 | |
| 10,530,487 B2* | 1/2020 | Ding | H04B 10/5561 | |
| 10,831,081 B2* | 11/2020 | Vera Villarroel | G02F 1/2255 | |
| 11,048,139 B2* | 6/2021 | Zhou | G02F 1/2255 | |
| 11,287,720 B2* | 3/2022 | Hayashi | G02F 1/2255 | |
| 11,378,825 B2* | 7/2022 | Kissa | G02F 1/025 | |
| 2002/0071622 A1* | 6/2002 | Betts | G02F 1/2257 | 385/2 |
| 2002/0154842 A1* | 10/2002 | Betts | G02F 1/0316 | 385/2 |
| 2007/0009195 A1* | 1/2007 | Eriksson | G02F 1/035 | 385/40 |
| 2011/0158576 A1* | 6/2011 | Kissa | G02F 1/225 | 385/2 |
| 2011/0298561 A1* | 12/2011 | Green | G02F 1/0121 | 333/236 |
| 2012/0230627 A1* | 9/2012 | Motoya | G02F 1/2255 | 385/3 |
| 2013/0343693 A1* | 12/2013 | Doerr | G02F 1/011 | 385/3 |
| 2016/0139486 A1* | 5/2016 | Dagli | G02F 1/01708 | 438/69 |
| 2016/0202592 A1* | 7/2016 | Hollis | G02F 1/2255 | 385/2 |
| 2016/0291352 A1* | 10/2016 | Kissa | G02F 1/0316 | |
| 2016/0291353 A1* | 10/2016 | Mcbrien | G02F 1/0102 | |
| 2016/0313579 A1* | 10/2016 | Yokoyama | G02B 6/125 | |
| 2016/0363834 A1* | 12/2016 | Velthaus | G02F 1/2255 | |
| 2017/0023842 A1* | 1/2017 | Dagli | G02F 1/2257 | |
| 2017/0075148 A1* | 3/2017 | Baudot | G02F 1/025 | |
| 2017/0075187 A1* | 3/2017 | Aimone | G02F 1/2257 | |
| 2017/0307954 A1* | 10/2017 | Dagli | G02B 6/42 | |
| 2018/0120666 A1* | 5/2018 | Kondou | G02F 1/2255 | |
| 2018/0203322 A1* | 7/2018 | Zhou | G02F 1/025 | |
| 2018/0252948 A1* | 9/2018 | Mcbrien | G02F 1/0102 | |
| 2018/0341164 A1* | 11/2018 | Williams | G02F 1/2257 | |
| 2019/0253149 A1* | 8/2019 | Ding | G02F 1/0123 | |
| 2019/0324345 A1* | 10/2019 | Vera Villarroel | G02F 1/2255 | |
| 2019/0361315 A1* | 11/2019 | Zhou | G02F 1/025 | |
| 2020/0026147 A1* | 1/2020 | Vera Villarroel | G02F 1/2257 | |
| 2020/0225556 A1* | 7/2020 | Hayashi | G02F 1/017 | |
| 2021/0080796 A1* | 3/2021 | Kissa | G02F 1/0356 | |

OTHER PUBLICATIONS

Wang et al., "Nanophotonic lithium niobate electro-optic modulators," Opt. Express 26, 1547-1555 (2018) (Year: 2018).*
Wang et al. Integrated lithium niobate electro-optic modulators operating at CMOS-compatible voltages. Nature 562, 101-104 (2018). https://doi.org/10.1038/s41586-018-0551-y (Year: 2018).*
Dogru et al., Traveling Wave Electrodes for Substrate Removed Electro-Optic Modulators With Buried Doped Semiconductor Electrodes, IEEE Journal of Quantum Electronics, vol. 49, No. 7, Jul. 2013 (Year: 2013).*
Akiyama et al., High-speed and efficient silicon modulator based on forward-biased pin diodes, Frontiers in Physics, vol. 2, 2014, DOI=10.3389/fphy.2014.00065 (Year: 2014).*
Lewen et al., Ultra high-speed segmented traveling-wave electroabsorption modulators, OSA/OFC 2003, PD38-1 (Year: 2003).*
Patel et al., "Design, analysis, and transmission system performance of a 41 GHz silicon photonic modulator," Opt. Express 23, 14263-14287 (2015) (Year: 2015).*
Stepanenko et al., Optimization of RF electrodes for electro-optic modulator based on quantum-confined Stark effect, 2019 J. Phys.: Conf. Ser. 1145 012028 (Year: 2019).*
He et al., High-performance hybrid silicon and lithium niobate Mach-Zehnder modulators for 100 Gbits-1 and beyond. Nat. Photonics 13, 359-364 (2019) (Year: 2019).*
Shao et al., Microwave-to-optical conversion using lithium niobate thin-film acoustic resonators. Optica 6, 1498-1505 (2019), available Jul. 11, 2019 at https://arxiv.org/pdf/1907.08593.pdf (Year: 2019).*

* cited by examiner

COPLANAR WAVEGUIDE WIRE ELECTRODE STRUCTURE AND MODULATOR

CROSS-REFERENCE TO RELATED APPLICATIONS

This application claims priority to Chinese patent application No. 2020104097641, filed to the China National Intellectual Property Administration on May 14, 2020 and entitled "COPLANAR WAVEGUIDE WIRE ELECTRODE STRUCTURE AND MODULATOR", the disclosure of which is hereby incorporated by reference in its entirety. See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This application relates to the field of electronic communication, and in particular, to a coplanar waveguide wire electrode structure and a modulator.

2. Description of Related Art Including Information Disclosed Under 37 CFR 1.97 and 37 CFR 1.98

In recent years, the rapid development of emerging network application services, such as the Internet of Things, unmanned driving, telemedicine, and distance education has put forward higher requirements for high-speed and large-capacity communication technologies. Due to the characteristics of a large bandwidth, high reliability, a low cost, and a strong anti-interference ability, optical communication has achieved rapid development on high-speed and large-capacity communication. How to load high-speed electrical signals on optical carriers is a core research content. As a device for converting the electrical signals into optical signals, an electro-optic modulator is one of the core devices in optical interconnection systems, optical computing systems, and optical communication systems. The performance of the modulator plays an important role in the transmission distance and transmission speed of the optical signals. As people increasingly and urgently demand high-speed and large-capacity communication technologies, higher requirements have been put forward for the modulation rate of the electro-optic modulators.

The electro-optic modulator is a modulator made by an electro-optic effect of some electro-optic crystals, such as a lithium niobate (LiNbO3) crystal, a gallium arsenide (GaAs) crystal and a lithium tantalate (LiTaO3) crystal. The electro-optic effect means that, when a voltage is applied to the electro-optic crystal, the refractive index of the electro-optic crystal will be changed, resulting in a change in the characteristics of the light wave passing through the crystal, so as to realize the modulation of the phase, amplitude, intensity and polarization state of the optical signal.

The input optical wave of an MZ interferometric modulator passes through a section of an optical path and is divided into two equal beams at a one-half light splitting element to be respectively transmitted by using two optical waveguides. The optical waveguide is made of an electro-optic material, and the refractive index of the optical waveguide varies with an external voltage, so that the two optical signals arrive at a light combining element to produce a phase difference. If an optical path difference between two light beams is an integral multiple of a wavelength, a coherence between the two light beams is enhanced. If the optical path difference between the two light beams is half of the wavelength, the coherence between the two light beams is canceled, and the modulator is small in output. Therefore, the optical signal can be modulated by controlling a voltage.

However, when the coplanar waveguide wire electrode structure of the high-speed electro-optic modulator is designed, in order to prevent microwave reflection of the electrical signal, the impedance of an electrode material needs to be consistent with the impedance of an input end. In addition, it is not only required to ensure that the transmission speed of the electrical signal is the same or close to the group velocity of the optical signal transmitted in the waveguide, but also required to reduce the transmission loss of the electrical signal as much as possible, which puts forward high requirements for electrode design.

BRIEF SUMMARY OF THE INVENTION

This application is mainly intended to provide a coplanar waveguide wire electrode structure and a modulator, to ensure that the transmission speed of the electrical signal is the same or close to the group velocity of the optical signal transmitted in the waveguide, so as to reduce the transmission loss of an electrical signal as much as possible.

In order to implement the above objective, on the one hand, this application provides a coplanar waveguide wire electrode structure, including a metal electrode and an optical waveguide. The metal electrode includes a ground electrode and a signal electrode. Connecting arms are arranged on both sides of the signal electrode. Connecting arms are arranged inside the ground electrode. Tail ends of the connecting arms of the signal electrode are provided with signal wire extension electrodes. Tail ends of the connecting arms of the ground electrodes are provided with ground wire extension electrodes. A distance D1 is designed between the signal wire extension electrodes and the ground wire extension electrodes. The optical waveguide passes through spaces between the signal wire extension electrodes and the ground wire extension electrodes.

Optionally, a coplanar waveguide wire electrode structure includes a metal electrode and an optical waveguide. The metal electrode includes a ground electrode and a signal electrode. A plurality of connecting arms are arranged on both sides of the signal electrode. Tail ends of the connecting arms are provided with signal wire extension electrodes. A distance D2 is designed between the signal wire extension electrodes and the ground electrode. The optical waveguide passes through spaces between the signal wire extension electrodes and the ground electrode.

Optionally, a coplanar waveguide wire electrode structure includes a metal electrode and an optical waveguide. The metal electrode includes a ground electrode and a signal electrode. A plurality of connecting arms are arranged inside the ground electrode. Tail ends of the connecting arms are provided with ground wire extension electrodes. A distance D3 is designed between the ground wire extension electrodes and the signal electrode. The optical waveguide passes through spaces between the ground wire extension electrodes and the signal electrode.

Optionally, a vertical distance of each of the connecting arms from an edge on a left side of each of the signal wire extension electrodes or the ground wire extension electrodes is t1. A vertical distance of the connecting arm from an edge on a right side of the signal wire extension electrode or the ground wire extension electrode is t2. A vertical distance between two adjacent connecting arms is T. The vertical distances meet the following conditions: t1≥0, t2≥0, T>0, 0<t1+t2≤T, and values of t1 and t2 range from 1 to 100 μm.

Optionally, a width of the connecting arm is δ1, a width of the extension electrode is δ2, and the widths meet the following conditions: δ1<t1+t2, 0<δ1<30 μm, 0<δ2<30 μm.

Optionally, a distance between the ground electrode and the signal electrode is D, where a range of D is as follows: 3 μm≤D≤200 μm. A width of the ground electrode ranges from 5 to 2000 μm, and a width of the signal electrode ranges from 5 to 1000 μm.

Optionally, the distance D1 is 1 μm<D1<D, the distance D2 is 1 μm<D2<D, and the distance D3 is 1 μm<D3<D.

Optionally, the optical waveguide consists of an input waveguide, a waveguide light-splitting element, a double-arm waveguide, a waveguide light-combining element and an output waveguide. The metal electrode consists of one signal electrodes and two ground electrodes which are disposed on a left side, a middle part and a right side of the double-arm waveguide.

Optionally, the connecting arm is perpendicular to the signal wire extension electrode or the ground wire extension electrode. The ground wire extension electrode is parallel to the ground electrode. The signal electrode is parallel to the signal wire extension electrode.

On the other hand, this application provides a modulator of a coplanar waveguide wire electrode structure, including a substrate and a lithium niobate layer formed on a surface of the substrate. The lithium niobate layer is provided with the above coplanar waveguide wire electrode structure.

Optionally, the lithium niobate layer is etched X-cut, Y-cut or Z-cut thin film lithium niobate. The substrate under the lithium niobate layer is made of a multilayer material of silicon, or silicon dioxide or silicon and silicon dioxide or a multilayer material of silicon dioxide, metal and silicon.

This application has the following beneficial effects. By adopting the coplanar waveguide wire electrode structure, and by ensuring that the impedance of an electrode material is consistent to that of an input end and ensuring that the transmission speed of the electrical signal is the same or close to the group velocity of the optical signal transmitted in the waveguide, the transmission loss of an electrical signal is reduced as much as possible. On the basis of an original MZ interferometric modulator, by extending the metal electrode, the distance between the electrodes is actually shortened, so that in the case of less influence on a characteristic impedance, an interval between the electrodes is reduced, and an electric field intensity between the electrodes is increased.

BRIEF DESCRIPTION OF THE SEVERAL VIEWS OF THE DRAWINGS

In order to more clearly illustrate the specific implementations of the disclosure or the technical solutions in the related art, the drawings used in the description of the specific implementations or the related art will be briefly described below. It is apparent that the drawings in the following descriptions are only some implementations of the disclosure. Other drawings can be obtained from those skilled in the art according to these drawings without any creative work.

1—Ground electrode, 2—Signal electrode, 3—Optical waveguide, 4—Lithium niobate layer, 5—Substrate, 6—Ground wire extension electrode, 7—Connecting arm, 8—Signal wire extension electrode.

DETAILED DESCRIPTION OF THE INVENTION

In order to enable those skilled in the art to better understand the solutions of the disclosure, the technical solutions in the embodiments of the disclosure will be clearly and completely described below in combination with the drawings in the embodiments of the disclosure. It is apparent that the described embodiments are only part of the embodiments of the disclosure, not all the embodiments. Based on the embodiments in the disclosure, all other embodiments obtained by those of ordinary skilled in the art without creative work shall fall within the protection scope of the disclosure.

It is to be noted that terms "first", "second" and the like in the description, claims and the above mentioned drawings of the disclosure are used for distinguishing similar objects rather than describing a specific sequence or a precedence order. It should be understood that the data used in such a way may be exchanged where appropriate, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In the disclosure, terms "mount", "configure", "provide", "connect", "link" and "sleeved" should be broadly understood. For example, the term "connect" may be fixed connection, detachable connection or integral construction. As an alternative, the term "connect" may be mechanical connection, or electrical connection. As an alternative, the term "connect" may be direct connection, or indirect connection through a medium, or communication in two devices, components or constituting parts. For those of ordinary skill in the art, specific meanings of the above mentioned terms in the disclosure may be understood according to a specific condition.

It is to be noted that the embodiments in the disclosure and the features in the embodiments may be combined with one another without conflict. The disclosure will be described below in detail with reference to the drawings and the embodiments.

Embodiment 1

Figure 1:
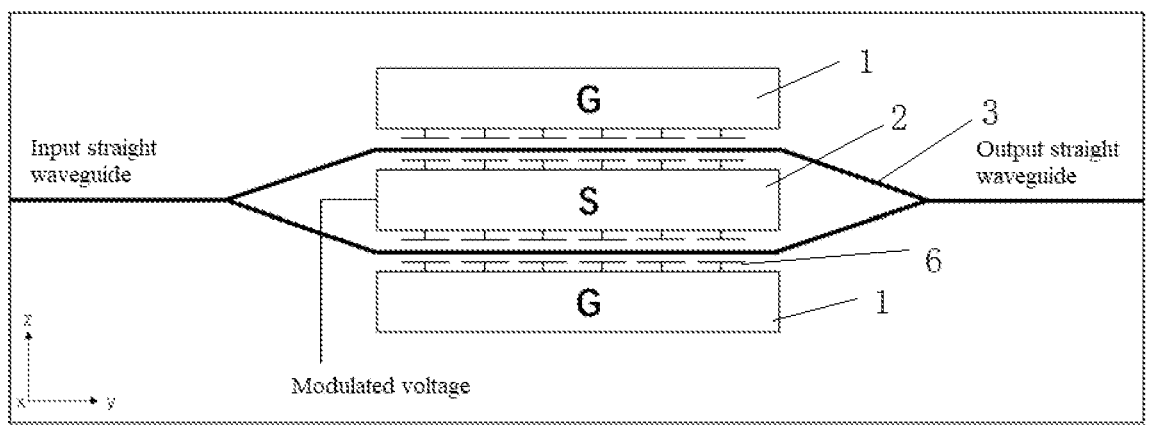
FIG. 1 is a schematic view of a diagram I of a coplanar waveguide wire electrode structure.
Figure 2:
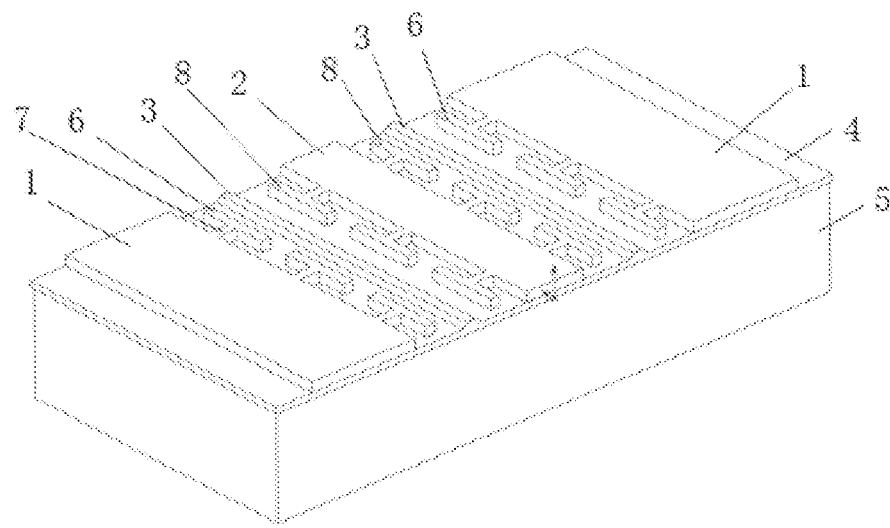
FIG. 2 is a three-dimensional sectional view of an MZ electro-optic modulator according to an embodiment of this application.

As shown in FIG. 1 and FIG. 2, the disclosure provides a coplanar waveguide wire electrode structure. The coplanar waveguide wire electrode structure includes a metal electrode and an optical waveguide 3. The metal electrode includes a ground electrode 1 and a signal electrode 2. At least two connecting arms 7 are arranged on both sides of the signal electrode 2. Tail ends of the connecting arms 7 are provided with signal wire extension electrodes 8. The connecting arms 7 are further arranged in corresponding positions on a side of the ground electrode 1 close to the signal electrode 2. Tail ends of the connecting arms 7 are provided with ground wire extension electrodes 6. A distance D1 is designed between the signal wire extension electrodes 8 and the ground wire extension electrodes 6. The optical waveguide passes through spaces between the signal wire extension electrodes 8 and the ground wire extension electrodes 6.

In this embodiment, a vertical distance of each of the connecting arms 7 from an edge on a left side of each of the signal wire extension electrodes 8 or the ground wire extension electrodes 6 is t1. A vertical distance of the connecting arm 7 from an edge on a right side of the signal wire extension electrode 8 or the ground wire extension electrode 6 is t2. A vertical distance between two adjacent connecting arms 7 is T. The vertical distances meet the following conditions: t1≥0, t2≥0, T>0, 0<t1+t2≤T.

In this embodiment, values of t1 and t2 range from 1 to 100 μm.

In this embodiment, a width of the connecting arm 7 is δ1, a width of the signal wire extension electrode 8 or the ground wire extension electrode 6 is δ2, and the widths meet the following conditions: δ1<t1+t2, 0<δ1<10 μm, 0<δ2<10 μm.

In this embodiment, a distance between the ground electrode 1 and the signal electrode 2 is D, where a range of D is as follows: 3 μm≤D≤200 μm.

In this embodiment, a range of the distance D1 is 1 μm<D1<D.

In this embodiment, a width of the ground electrode 1 ranges from 5 to 2000 μm, and a width W of the signal electrode 2 ranges from 5 to 1000 μm.

In this embodiment, the connecting arm 7 forms a "T" shape or an "L" shape with the signal wire extension electrode 8 or the ground wire extension electrode 6.

In this embodiment, the optical waveguide 3 consists of an input waveguide, a waveguide light-splitting element, a double-arm waveguide, a waveguide light-combining element and an output waveguide. The metal electrode consists of one signal electrodes and two ground electrodes which are disposed on a left side, a middle part and a right side of the double-arm waveguide.

In this embodiment, the connecting arm 7 is perpendicular to the signal wire extension electrode 8 or the ground wire extension electrode 6. The ground wire extension electrode 6 is parallel to the ground electrode 1. The signal electrode 2 is parallel to the signal wire extension electrode 8.

As shown in FIG. 2, this application provides a modulator of a coplanar waveguide wire electrode structure. The modulator includes a substrate 5 and a lithium niobate layer 4 formed on a surface of the substrate. The lithium niobate layer 4 is provided with the above coplanar waveguide wire electrode structure.

In this embodiment, the lithium niobate layer 4 is etched X-cut, Y-cut or Z-cut thin film lithium niobate. The substrate under the lithium niobate layer is made of a multilayer material of silicon, or silicon dioxide or silicon and silicon dioxide or a multilayer material of silicon dioxide, metal and silicon.

Embodiment 2

Figure 5:
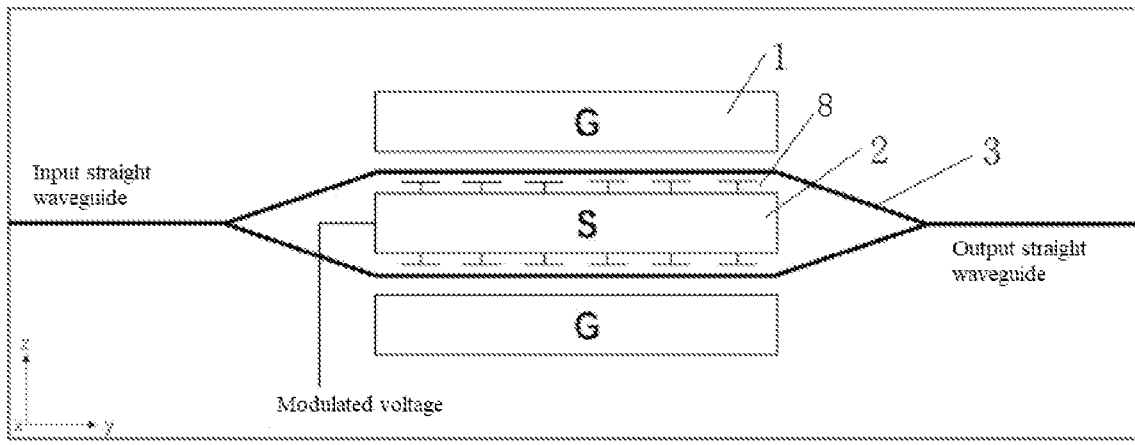
FIG. 5 is a schematic view of a diagram IV of the coplanar waveguide wire electrode structure.

As shown in FIG. 5, a difference between this embodiment and the Embodiment 1 lies in that, the connecting arm 7 and the ground wire extension electrode 6 are not disposed on two sides of the ground electrode 1. The optical waveguide passes through a gap between the ground electrode 1 and the signal wire extension electrode 8.

A range of the optical waveguide passing through the distance D2 between the ground electrode 1 and the signal wire extension electrode 8 is 1 μm<D2<D.

Embodiment 3

Figure 6:
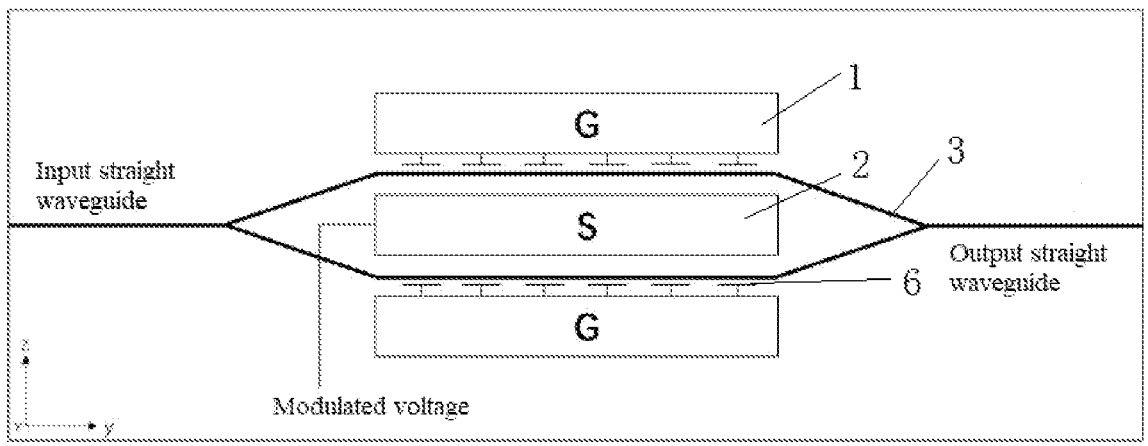
FIG. 6 is a schematic view of a diagram V of the coplanar waveguide wire electrode structure.

As shown in FIG. 6, a difference between this embodiment and the Embodiment 1 lies in that, the connecting arm 7 and the signal wire extension electrode 8 are not disposed on two sides of the signal electrode 2. The optical waveguide passes through a gap between the ground electrode 1 and the ground wire extension electrode 6.

A range of the optical waveguide passing through the distance D3 between the ground electrode 1 and the ground wire extension electrode 6 is 1 μm<D3<D.

According to the coplanar waveguide wire electrode structure in this application, by ensuring that the impedance of an electrode material is consistent to that of an input end and ensuring that the transmission speed of the electrical signal is the same or close to the group velocity of the optical signal transmitted in the waveguide, the transmission loss of an electrical signal is reduced as much as possible.

Generally, the impedance characteristic of a coplanar waveguide wire is approximately proportional to the ratio of the distance between the ground electrode and the signal electrode to the width of the signal electrode. For a lithium niobate modulator, in order to ensure that the effective electric field is maximized without affecting the transmission of light, the distance between a ground wire and a signal wire, that is, an effective electrode distance of the optical waveguide, is merely a few microns between the ground electrode and the signal electrode generally. In order to meet the impedance characteristic, generally, the width W of the signal electrode is merely about ten microns. Meanwhile, the loss of the coplanar waveguide wire is usually determined by the width W of the signal electrode, a thickness of the coplanar waveguide wire and metal conductivity. For a same material, the metal conductivity is certain. However, for the lithium niobate modulator, the width W of the signal electrode is usually limited under a traditional structure. In order to reduce electrical loss, the thickness needs to be very large generally.

In this application, the signal electrode is wide as possible, and impedance matching is met. GSG is the coplanar waveguide wire (CPW or CPWG), G is the ground electrode, and S is the signal electrode. An extension metal electrode same as the ground electrode is grown on a side of the ground electrode. On two sides of the signal electrode S, extension electrodes same as the ground wire S are grown. A distance d between the extension metal electrodes is less than a distance between electrodes.

A vertical distance of the connecting arm from an edge on a left side of each of the extension electrodes is t1. A vertical distance of the connecting arm from an edge on a right side of the extension electrode is t2. A vertical distance between two adjacent connecting arms is T. The vertical distances meet the following conditions: $t1 \geq 0$, $t2 \geq 0$, $T>0$, $0<t1+t2 \leq T$.

That is to say, from the figures, in the extension electrodes, it may exist that each extension electrode connecting arm is only connected to the left side extension electrode or the right side extension electrode, without the extension electrode on the other side, or may exist that no distances exist between the extension electrodes connected to the extension metal electrode connecting arms, so that the extension electrodes are connected to each other.

Figure 3:
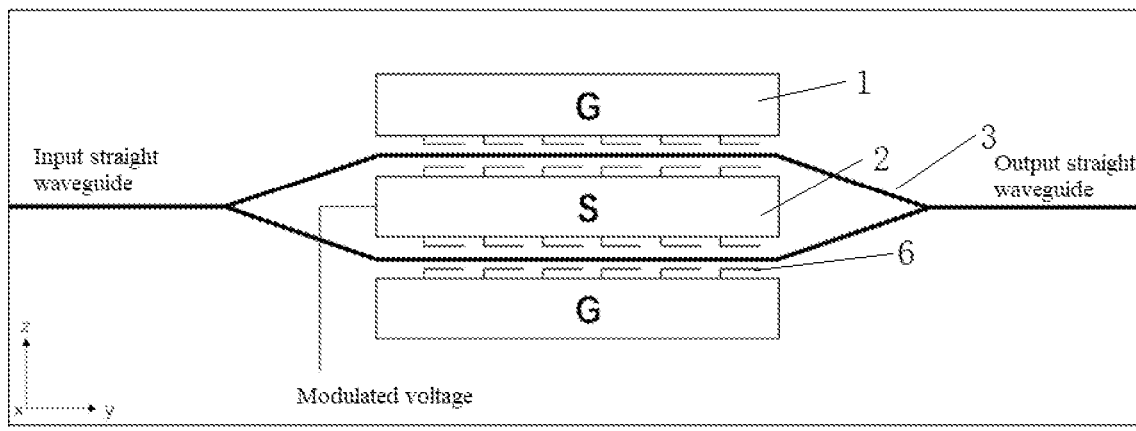
FIG. 3 is a schematic view of a diagram II of the coplanar waveguide wire electrode structure.
Figure 4:
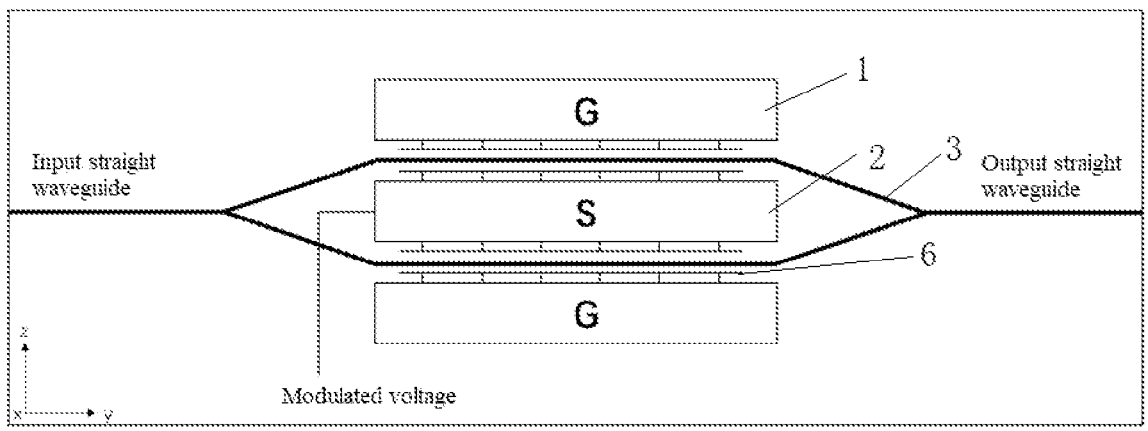
FIG. 4 is a schematic view of a diagram III of the coplanar waveguide wire electrode structure.

When t1=0, the formed coplanar waveguide wire electrode structure is shown in FIG. 3. When t1+t2=T, the formed coplanar waveguide wire electrode structure is shown in FIG. 4.

For such a structure, in the case of the proper widths δ1 of the extension electrode connecting arms and the widths δ2 of the extension electrodes, the distance between the electrodes of the optical waveguide is no longer the same as the distance between the ground wire and the signal wire. In this case, the distance between the ground wire and the signal wire and the width of the signal wire can be changed without affecting the distance between the electrodes of the optical waveguide, so that the loss of transmission wires is reduced. The coplanar waveguide wire of this application meets that the impedance is the same as or similar to the impedance of the input end (generally 50Ω). A propagation velocity of the electric signal in the coplanar waveguide wire is the same as or close to a velocity of light in the optical waveguide.

Through the adoption of the modulator of this application, by extending the metal electrode, the distance between the electrodes is actually shortened, so that resistance loss of the electrical signal transmitted in the coplanar waveguide wire is reduced.

Although the implementations of the disclosure are described with reference to the accompanying drawings, those skilled in the art can make various modifications and variations to the disclosure without departing from the spirit and scope of the disclosure. Thus, such modifications and variations of the disclosure fall within the scope of the appended claims.

We claim:

1. A coplanar waveguide wire electrode structure, comprising a metal electrode and an optical waveguide, wherein the metal electrode comprises a ground electrode and a signal electrode, connecting arms are arranged on both sides of the signal electrode, connecting arms are arranged inside the ground electrode, tail ends of the connecting arms of the signal electrode are provided with signal wire extension electrodes, tail ends of the connecting arms of the ground electrodes are provided with ground wire extension electrodes, a distance D1 is designed between the signal wire extension electrodes and the ground wire extension electrodes, and/or a distance D2 is designed between the signal wire extension electrodes and the ground electrode, and/or a distance D3 is designed between the ground wire extension electrodes and the signal electrode, and the optical waveguide passes through spaces between the signal wire extension electrodes and the ground wire extension electrodes, the connecting arm forms a "L" shape with the signal wire extension electrode or the ground wire extension electrode.

2. The coplanar waveguide wire electrode structure as claimed in claim 1, wherein a distance of each of the connecting arms from an edge on a left side of each of the signal wire extension electrodes or the ground wire extension electrodes is t1, a distance of the connecting arm from an edge on a right side of the signal wire extension electrode or the ground wire extension electrode is t2, a distance between two adjacent connecting arms is T, the vertical distances meet the following conditions: $t1 \geq 0$, $t2 \geq 0$, $T>0$, $0<t1+t2 \leq T$, and values of t1 and t2 range from 1 to 100 µm.

3. The coplanar waveguide wire electrode structure as claimed in claim 1, wherein a width of the connecting arm is δ1, a width of the extension electrode is δ2, and the widths meet the following conditions: $\delta1<t1+t2$, $0<\delta1<30$ µm, $0<\delta2<30$ µm.

4. The coplanar waveguide wire electrode structure as claimed in claim 1, wherein a distance between the ground electrode and the signal electrode is D, wherein a range of D is as follows: 3 µm≤D≤200 µm, a width of the ground electrode ranges from 5 to 2000 µm, and a width of the signal electrode ranges from 5 to 1000 µm.

5. The coplanar waveguide wire electrode structure as claimed in claim 4, wherein the distance D1 is 1 µm<D1<D, the distance D2 is 1 µm<D2<D, and the distance D3 is 1 µm<D3<D.

6. The coplanar waveguide wire electrode structure as claimed in claim 1, wherein the optical waveguide consists of an input waveguide, a waveguide light-splitting element, a double-arm waveguide, a waveguide light-combining element and an output waveguide, the metal electrode consists of one signal electrodes and two ground electrodes which are disposed on a left side, a middle part and a right side of the double-arm waveguide.

7. The coplanar waveguide wire electrode structure as claimed in claim 1, wherein the connecting arm is perpendicular to the signal wire extension electrode or the ground wire extension electrode, the ground wire extension electrode is parallel to the ground electrode, and the signal electrode is parallel to the signal wire extension electrode.

8. A coplanar waveguide wire modulator, comprising a substrate and a lithium niobate layer formed on a surface of the substrate, wherein the lithium niobate layer is provided with the coplanar waveguide wire electrode structure as claimed in claim 1.

9. The modulator as claimed in claim 8, wherein the lithium niobate layer is etched X-cut, Y-cut or Z-cut thin film lithium niobate, the substrate under the lithium niobate layer is made of a multilayer material of silicon, or silicon dioxide or silicon and silicon dioxide or a multilayer material of silicon dioxide, metal and silicon.

* * * * *